United States Patent Office 3,472,790
Patented Oct. 14, 1969

---

3,472,790
ISOMERIZATION CATALYST AND METHOD FOR PREPARING AND USING SAME
Joseph P. Giannetti, Allison Park, Howard G. McIlvried, Pittsburgh, and Raynor T. Sebulsky, Verona, Pa., assignors to Gulf Research & Development Company, Pittsburgh, Pa., a corporation of Delaware
No Drawing. Filed Apr. 3, 1967, Ser. No. 627,640
Int. Cl. B01j 11/64; C07c 5/24
U.S. Cl. 252—442     12 Claims

ABSTRACT OF THE DISCLOSURE

An active, low temperature paraffin isomerization catalyst is prepared by reacting a composite catalyst comprising a major proportion of alumina and a minor proportion of a metalliferous material having hydrogenating activity, such as platinum, with a mixture of sulfur dioxide and chlorine under nonreducing conditions at a temperature effective to promote a substantial increase in the chlorine content of the composite catalyst.

BACKGROUND OF THE INVENTION

In application Ser. No. 358,628, filed in the United States Patent Office on Apr. 9, 1964, now Patent No. 3,322,688, there is disclosed a method of activating composite catalytic materials comprising alumina and a metalliferous hydrogenating component by treatment with sulfur monochloride, and oxygen. The resulting catalyst has activity in the low temperature isomerization of normal paraffins to their respective isomers so as to produce relatively high yields. In another application, Ser. No. 388,678, filed in the United States Patent Office on Aug. 10, 1964, now Patent No. 3,322,689, a method is disclosed wherein catalysts activated with sulfur monochloride or other sulfur chlorides are treated with hydrogen chloride to improve the susceptibility of the catalyst to activation with the sulfur chlorides.

SUMMARY OF THE INVENTION

It has now been found that the activity of such composite catalytic materials can be enhanced to a high degree by activation with a mixture of sulfur dioxide and chlorine under nonreducing conditions at a temperature effective to promote a substantial increase in the chlorine content of the catalyst. Surprisingly, it has been discovered that the catalysts prepared in this manner retain a higher degree of activity after protracted use as an isomerization catalyst than do catalysts prepared by activation with previously proposed compounds containing sulfur and chlorine.

According to another aspect of this invention, the activity of the sulfur dioxide-chlorine activated catalysts can be further enhanced by the incorporation of a hydrogen chloride pretreatment and a hydrogen chloride posttreatment.

The use of a gaseous catalyst activating agent comprising sulfur dioxide and chlorine has many advantages over the liquid activators such as those comprising a sulfur chloride. These advantages include: (1) ease in controlling the rate of addition of the activating agent; (2) minimization of hot spots in the activation zone; (3) ease of recovery and recycling unreacted material; (4) minimization of handling problems; and (5) simplification of catalyst regeneration.

DESCRIPTION OF THE PREFERRED EMBODIMENTS

As previously mentioned, the composite catalyst is activated by contacting the catalyst with a mixture of sulfur dioxide and chlorine under nonreducing conditions while at a temperature effective to promote a substantial increase in the chlorine content of the catalyst.

The activation of the catalyst with the sulfur dioxide-chlorine mixture takes place most readily at elevated temperatures. Very active catalysts are obtained when using activation temperatures in the range of between about 325° and about 800° F., but higher or lower temperatures may be suitably employed. For example, temperatures as low as about 200° F. are effective to promote the desired activation. However, the treating temperature should not exceed about 1000° F. to avoid unnecessarily reducing the amount of chlorine combined with the catalyst base.

The pressure employed in the catalyst activation operation of this invention using the sulfur dioxide-chlorine mixture may be varied over a broad range, but is preferably atmospheric. However, elevated pressures may be suitably employed with equally good results. The time of contact may also be varied over a wide range. Contact times in the range of from about 0.5 to about 24 hours, and preferably from about 5 to 10 hours are effective to increase the chlorine content of the catalyst base to a satisfactory level for the purposes of this invention.

The sulfur dioxide-chlorine mixture may be contacted with the catalyst base in any proportions, while under the foregoing conditions, which are sufficient to substantially increase the chlorine content of the catalyst base. Proportions sufficient to increase the chlorine content of the catalyst base by about 1 percent under the reaction conditions employed will produce an appreciable improvement in the activity of the catalyst, but it is preferred to utilize larger proportions sufficient to increase the chlorine content of the catalyst by at least about 3 and preferably up to about 7 percent by weight. However, still larger proportions can be used when hydrogen chloride treatment is omitted; for example, there can be used amounts sufficient to yield up to about 20 percent chlorine in the catalyst base without undue difficulties. Within the limits indicated, the use of the chlorine weight ratios with respect to the catalyst base of between about 0.05 and 1.0, and preferably between about 0.1 and 0.3, are effective at the conditions disclosed herein to achieve the desired results.

The sulfur dioxide component is employed with the chlorine in amounts between about 0.1 and about 10 mols of sulfur dioxide per mol of chlorine, and preferably in the range of between about 0.5 and about 5 mols of sulfur dioxide per mol of chlorine. Excellent results are obtained with about equal molar proportions of sulfur dioxide and chlorine.

While it is presumed that the chlorine component interacts chemically in some not fully understood way with the catalyst base, available evidence indicates that the nature of the reaction is unique, as catalysts prepared in the manner disclosed herein have been found markedly superior to comparable catalysts in which the chlorine content of the catalyst is increased, for example, by treatment with sulfur chlorides. In addition, the catalyst produced by the process of the present invention maintains a relatively high activity even after prolonged usage.

As indicated previously, the sulfur dioxide-chlorine treatment of the catalyst base is carried out under nonreducing conditions effective to promote a substantial increase in the chlorine content of the catalyst base. The use of nonreducing conditions is important, since reducing conditions may lead to the formation of hydrogen chloride, which is not effective for achieving the highly active catalysts herein disclosed. The nonreducing conditions may be achieved merely by exclusion of materials other than the catalyst base and the sulfur dioxide-chlorine mix-
} ture from the reaction zone. Alternatively, the sulfur dioxide-chlorine activating gas may be contacted with the catalyst base, together with an inert carrier gas, such as nitrogen. Oxygen or oxygen-inert gas mixtures, such as air, may also be conveniently employed as carrier gases. Oxygen also can be used during or after the activation, but such use is not essential to produce highly active catalysts.

By "nonreducing conditions" is meant essentially nonreducing conditions. Accordingly, conditions under which a small proportion of a reducing component, such as hydrogen, is present is not intended to be excluded.

As previously indicated, another aspect of this invention involves the pretreatment of the composite catalyst with hydrogen chloride to improve its susceptibility to activation with the sulfur dioxide-chlorine mixture. In addition, a catalyst posttreatment with hydrogen chloride is preferably employed.

The hydrogen chloride employed in the pretreating step may be used in any proportion with respect to the composite catalytic material that is effective to increase the chlorine content of such material, as even a small increase in the chlorine content of such material obtained in this fashion will effectively increase the isomerization catalytic activity obtainable by the subsequent treatment with the sulfur dioxide and chlorine activating gas. It is preferred to employ hydrogen chloride in excess of the amount that is capable of combining with the composite catalytic material at the reaction conditions employed. Excellent results are obtainable by the use of hydrogen chloride in proportions of from about 0.05 to 1:1 by weight with respect to the catalyst, but larger or smaller proportions can also be used with good results. The action of the hydrogen chloride upon the composite catalytic material takes place easily at atmospheric pressures, and elevated pressures are not necessary, although such pressures may be used if desired.

The way in which the hydrogen chloride acts to improve the susceptibility of the composite catalyst to activation with the sulfur dioxide-chlorine mixture is not known precisely. However, it is apparently related to the loss of water from the catalyst base during the pretreatment. The water that is removed during the pretreatment may be physically adsorbed water, chemically or pseudochemically bound water such as water of hydration, or water formed by the reaction of hydroxyl groups present on the surface of the alumina.

The hydrogen chloride pretreatment described above, can be carried out for as little as a few minutes, since some hydrogen chloride can combine with the catalyst even when only a small amount of water is removed from the composite catalytic material, but it is preferred to continue the hydrogen chloride pretreatment until no further evolution of water can be observed and until no further combination of hydrogen chloride with the catalyst is obtained at the reaction conditions selected. With the range of hydrogen chloride flow rate normally employed, this point will have been reached before about 3 hours at the temperatures indicated, and no further advantage is obtained by longer periods of hydrogen chloride treatment. However, the pretreatment has been successfully carried out for as long as 6 hours.

The hydrogen chloride utilized in the pretreatment operation need not be pure and may contain other materials that do not adversely affect the isomerization activity of the finished catalyst. In fact, it may be convenient to employ a diluent gas, such as hydrogen, in a ratio of about 1:1 to 10:1 by volume with the hydrogen chloride. Inert diluent gases, such as nitrogen, can also be used in the same or other proportions. Moreover, the hydrogen chloride need not be employed as such but can be introduced in the form of a hydrogen chloride precursor, such as the propyl chlorides, t-butyl chloride or other chlorine-substituted aliphatic hydrocarbon, when hydrogen is used as the diluent gas.

The hydrogen chloride pretreatment of the composite catalytic material may be carried out under any conditions effective to remove at least a portion of the water not previously removed during calcining and drying of the composite catalytic material and that will not adversely affect the catalytic activity of the catalyst by fusion. Temperatures in the range of from about 950° to about 1250° F., and preferably from about 1000° to about 1100° F., are normally effective for this purpose. Temperatures significantly less than about 950° F. should not be used for purposes of the present invention, since such lower temperatures are relatively less effective to enhance the susceptibility of the catalyst base to subsequent activation with sulfur dioxide and chlorine.

The hydrogen chloride posttreatment can be carried out at any conditions that will not unduly reduce the chlorine content of the previously activated catalyst. Temperatures in the range of about 60° to 900° F., preferably in the range of about 225° to 800° F., can be used. While some effect of the hydrogen chloride posttreatment may be noted at temperatures below 60° F., the temperature of the hydrogen chloride aftertreatment should not be significantly above about 900° F.

It is preferred to employ the hydrogen chloride in excess of the amount that will combine with the activated catalyst at the conditions of treatment, but smaller amounts may be used. By way of illustration, excellent results are obtainable by the use of hydrogen chloride in proportions of about 0.05 to 1:1 by weight with respect to the activated catalyst.

As in the case of the hydrogen chloride pretreatment, the hydrogen chloride posttreatment may be carried out at normal atmospheric pressures, and elevated pressures are not necessary, although such pressures can be used. Also, as in the case of the hydrogen chloride pretreatment, the contact with hydrogen chloride may be effected over a period of a few minutes to several hours, with good results. If desired, the hydrogen chloride posttreatment may be carried out before or during contact of the catalyst with a hydrocarbon feed to be isomerized. No significant additional advantages are observed from carrying out the hydrogen chloride posttreatment beyond 3 hours, although longer treating periods can be used successfully.

Further, as in the case of the hydrogen chloride pretreatment, the hydrogen chloride utilized in the posttreatment need not be pure and may contain as a diluent, hydrogen gas or inert diluent gases, such as nitrogen and the like, in any proportion. By way of illustration, good results are obtainable when hydrogen is employed in proportions of from about 1:1 to about 10:1 by volume with respect to the hydrogen chloride.

When both the hydrogen chloride pretreatment and posttreatment are employed, as is preferred, the increase in chlorine content of the catalyst may range from about 2 to about 7 percent by weight of the catalyst, for example.

The catalyst bases or precursors from which the activated catalysts of this invention are derived may comprise any form of porous alumina suitable for use as a catalytic agent or support. For example, excellent results are obtainable with aluminas prepared by calcining a beta-alumina trihydrate such as bayerite or mixtures thereof with other alumina hydrates. Aluminas prepared by calcining other hydrated aluminas, such as the amorphous alumina formed by hydrolysis of aluminum methoxide, or crystallized alumina hydrates, such as alpha-alumina trihydrate or gibbsite, or naturally occurring materials containing the same, such as bauxite, "new" beta-alumina trihydrate or nordstrandite, and alpha- and beta-alumina monohydrate such as boehmite and diaspore, or various combinations of any of these may also be used. Additionally, there may be used the aluminas described in Patents No. 3,188,174, No. 3,151,939 and No. 3,151,940, which aluminas are prepared by calcining an alumina hydrate containing 1.2 to 2.6 mols. of water of hydration.

The alumina bases useful in the present invention may be essentially pure alumina as is preferred, or they can contain small amounts, up to about 45 percent, of other refractory oxides, such as silica, beryllia, titania, zirconia or boria. Such aluminas are generally characterized by a high surface area, commonly ranging from about 200 to about 500 m.$^2$/g., or even more.

Especially advantageous results are obtainable when using aluminas having a surface area above about 250 m.$^2$/g., and more particularly, above about 300 m.$^2$/g., although aluminas of lower surface area may be used. Presumably, the amount of chlorine that can be taken up during the sulfur dioxide and chlorine treatment is a function of the surface area that can be contacted thereby, although available experimental evidence indicates that the amount of chlorine taken up is not necessarily limited by surface area.

The catalyst bases or precursors from which the activated catalysts of this invention are prepared are composited with a small proportion of at least one metalliferous component, having hydrogenating activity and selected from Group VI-A or from Group VIII of the long form Periodic Table of the Elements as illustrated in the Encyclopedia of Chemical Technology, second edition, volume 8, page 94, Interscience, New York, 1965. Examples of suitable materials are platinum, rhodium, palladium, nickel and tungsten. Especially good results are obtainable with platinum and palladium. In general, the hydrogenating component will be present in amounts in the range of from about 0.01 to about 5.0 percent by weight of the catalyst, and preferably from about 0.1 to about 2.5 percent, particularly in the case of noble metal components. By way of example, excellent results are obtainable with 0.2 and 0.7 percent platinum or 1 percent palladium on alumina.

The hydrogenating component can be composited with the alumina in any convenient way. Thus, the hydrogenating component can be deposited on a precalcined alumina support in the form of a water solution of a water-soluble salt, following which the wetted base can be calcined. Examples of such solutions are solutions containing chloroplatinic acid or other halogen platinum acids, or water solutions of nickel nitrate or ammonium tungstate. Alternatively, the hydrogenating component can be added as a salt to the alumina hydrate which may then be calcined or the hydrogenation compound may first be precipitated with a substance such as hydrogen sulfide and then calcined. Additionally, an aqueous metal sulfide sol, for example, a platinum sulfide sol, can be used to impregnate an alumina hydrate or admixed with an alumina hydrate prior to drying and calcining.

Regardless of the method of compositing the starting catalyst base, the noble metal hydrogenating components may be converted to a reduced form prior to the pretreatment with hydrogen chloride or the activation treatment with sulfur dioxide and chlorine. In the case of base metals from Group VIII of the Periodic Table, such as nickel, the hydrogenating component can remain in the form of a sulfide or oxide prior to the hydrogen chloride pretreatment and the sulfur dioxide-chlorine activation treatment. In the case of metals from Group VI-A of the Periodic Table, the hydrogenating component shall remain in the form of a sulfide during the activation treatment to prevent the loss of the hydrogenation component due to the formation of volatile complexes.

It is essential that the hydrogenating component be composited with the alumina base before the hydrogen chloride pretreatment or the sulfur dioxide-chlorine activation treatment, since deposition thereafter, such as from an aqueous solution in the form of a water-soluble salt, will render the catalyst inactive.

The catalyst base may contain halogen other than that incorporated by the sulfur dioxide-chlorine treatment. For example, some halogen content may result from the use of an aluminum halide as a starting material to form the alumina base or, alternatively, some halogen may remain in the catalyst owing to the use of a halogen-noble metal acid. However, the halogen content from such sources as these is not equivalent to the halogen content resulting from the sulfur dioxide-chlorine treatment for the purposes of this invention.

Catalysts that have been activated by the activating processes described herein are particularly useful in the low temperature isomerization of isomerizable saturated hydrocarbons, including not only straight-chain and slightly branched paraffins such as n-butane, n-pentane and n-hexane, but also cycloparaffins such as cyclopentane and cyclohexane and their corresponding methyl- and dimethyl-substituted derivatives. These compound need not be pure but can be mixed with other hydrocarbon materials as in the case of fractions obtained by fractional distillation of gasoline and naphtha cuts obtained from crude oils or reformates, for example. The process is especially advantageous for isomerization of straight-chain paraffin hydrocarbons containing 4 to 6 carbon atoms.

In addition to possessing a high initial activity when employed in low temperature isomerization reactions, the catalyst of this invention retains a higher degree of activity after protracted usage than do catalysts activated by other sulfur-containing compounds such as the sulfur chlorides, e.g., sulfur monochloride and thionyl chloride.

When the isomerization feed stock is derived from crude oil, the sulfur content may be so high as to detrimentally affect the catalyst. In such instances, it may be desirable to desulfurize the feed prior to isomerization in conventional manner, preferably by treatment with a suitable desulfurizing catalyst in the presence of hydrogen at elevated temperature and pressure. Desulfurization is especially important when the hydrogenating metal component of the hereindisclosed catalysts is sensitive to sulfur, as in the case of platinum.

Isomerization of the herein-disclosed feed stocks with the herein-disclosed catalysts is carried out at low temperatures in the range of from about 150° to about 450° F. in the presence of hydrogen gas at a pressure of atmospheric to 2000 p.s.i.g., preferably from about 50 to about 1200 p.s.i.g., using a hydrogen:hydrocarbon mol ratio in the range of from about 0 to about 10:1, preferably from about 0.1 to about 5:1. Space velocities of from about 0.3 to about 10 and preferably from about 0.5 to about 5 volumes of liquid feed per hour per volume of catalyst can be used in continuous processes. The hydrogen is effective to saturate unsaturated bonds and to suppress cracking. The desired hydrogen:hydrocarbon ratio and hydrogen pressure are advantageously maintained in a continuous process by recycling gases separated from the isomerized hydrocarbon product. Hydrogen chloride, or a compound acting as a hydrogen chloride precursor at the conditions of the reaction, such as t-butyl chloride or carbon tetrachloride, can be added to the reaction zone either with the feed stock or the hydrogen gas. The chloride can be added in amounts of 100 to 50,000 parts chlorine per million parts of feed stock, preferably 1000 to 10,000 p.p.m.

This invention may be best understood by reference to the following specific examples, which are illustrative only and are not intended to be limiting as to scope. All of the percentages indicated are by weight, unless otherwise specified.

Example 1

A commercial naphtha reforming catalyst in the amount of 125 grams containing 0.6 percent platinum on an alumina base, having a typical chlorine content of 0.6 percent and a typical surface area of about 425 square meters per gram is calcined at a temperature of 550° F. overnight and at 900° F. for two hours. This catalyst is reduced in a stream of hydrogen at 900° F. for two hours. The hydrogen flow rate utilized is 1.5 standard cubic feet per hour. The reduced catalyst is purged over a period of six hours in a flow of prepurified nitrogen.

The temperature of the catalyst is then raised to 1050° F. in nitrogen and a hydrogen-hydrogen chloride mixture comprising 1.5 standard cubic feet of hydrogen per hour and 15 grams of hydrogen chloride per hour is passed over the catalyst for a period of three hours. The temperature is reduced to 600° F. and a mixture of 17 grams of sulfur dioxide per hour and 19 grams of chlorine per hour is passed over the catalyst for 10 hours. At the conclusion of the addition, the temperature of the catalyst is maintained at 600° F. for one additional hour with a nitrogen purge at the rate of 0.57 standard cubic foot per hour. The catalyst temperature is then reduced to 400° F. and 15 grams of hydrogen chloride per hour are passed over the catalyst for a three hour period. An analysis of the catalyst indicates a chlorine content of 4.4 percent.

A stream of normal hexane containing 3000 p.p.m. chlorine (as t-butyl chloride) is passed over the catalyst at a temperature of 251° F. under a pressure of 400 p.s.i.g. while using a hydrogen to hexane molar ratio of 2.60 to 1 and a weight hourly space velocity of 1. Hexane conversion of 84.4 percent by weight is obtained.

Example 2

This example illustrates the preparation and evaluation of a catalyst differing from the scheme of Example 1 only in that oxygen is employed both during and subsequent to the sulfur dioxide and chlorine contacting. This preparation is for a larger quantity of catalyst, but the proportions of materials are generally the same as for Example 1.

Eight hundred ninety grams of the reduced platinum on alumina catalyst of the previous example is heated to a temperature of 1050° F. and a mixture of 110 grams of hydrogen chloride per hour and 11 standard cubic feet of hydrogen per hour is passed over the catalyst for a three hour period. The temperature is then reduced to 600° F. and a gas mixture of 87 grams of sulfur dioxide per hour, 88 grams of chlorine per hour, and 82 grams of oxygen per hour are passed over the catalyst for a 10 hour period. After this addition, the temperature is maintained at 600° F. while continuing only the flow of oxygen for 1 hour.

Next the temperature is raised to 850° F. with a mixture of 82 grams of oxygen per hour and 2 standard cubic feet of nitrogen per hour over a one and one-half hour period. The catalyst is held at 850° F. for 1 hour with the mixed gas flow. The temperature is then reduced to 400° F. and hydrogen chloride is passed at the rate of 110 grams per hour over the catalyst for 3 hours. An analysis of the catalyst indicates a chlorine content of 4.4 percent.

The catalyst is tested for activity employing a normal hexane feed with 3,000 p.p.m. chlorine (added as t-butyl chloride). This feed is passed over the catalyst at a temperature of 255° F., under a pressure of 400 p.s.i.g., while using a hydrogen to hexane molar ratio of 2.67 to 1 and a weight hourly space velocity of 1.03. Hexane conversion of 84.0 percent by weight is obtained.

Since this catalyst has the same chlorine content and gives the same hexane conversion as the catalyst of the previous example, it will be seen that oxygen may either be used in the catalyst activation or omitted depending upon which procedure is the more convenient.

Example 3

The following example is for comparison purposes and illustrates the relative activity of a catalyst prepared with a hydrogen chloride pretreatment and a sulfur dioxide-chlorine activation only.

An activated catalyst is prepared as in the immediately preceding example, except that following the oxygen treatment subsequent to sulfur dioxide-chlorine treatment, the catalyst is cooled directly to room temperature without posttreatment at 400° F. with hydrogen chloride. The catalyst is evaluated for normal hexane isomerization at the conditions of the immediately preceding example. A conversion of n-hexane of about 77 percent is obtained.

Example 4

The following example illustrates the use of a catalyst prepared by the same scheme as in Example 2 for processing normal butane.

One hundred twenty-five grams of the reduced platinum on alumina of the previous examples is heated to a temperature of 1050° F. and a hydrogen-hydrogen chloride mixture comprising 1.5 standard cubic feet of hydrogen per hour and 15 grams of hydrogen chloride per hour is passed over the catalyst for a period of three hours. The temperature is then reduced to 600° F. in a flow of nitrogen, and a gaseous mixture comprising 14 grams of sulfur dioxide per hour, 32 grams of chlorine per hour and 14 grams of oxygen per hour is passed over the catalyst for a period of five hours. At the conclusion of the activating gas addition, the temperature is raised to 850° F. over a two hour period and held at a temperature of 850° F. for a one hour period while continuing only the oxygen flow.

The temperature is then reduced to 400° F. and 14 grams per hour of hydrogen chloride are passed over the catalyst for a period of three hours. The catalyst is then cooled. An analysis of the catalyst indicates the presence of 3.6 percent chlorine.

To test the activity of this catalyst, a continuous run is conducted employing a normal butane feed stock. The butane is passed over the catalyst at a temperature of 325° F. and a pressure of 800 p.s.i.g. while employing a liquid hourly space velocity of 1 and a hydrogen to butane mol ratio of 2.5 to 1.

The normal butane feed stock is converted to isobutane in an amount of 46 percent by weight of the normal butane fed to the reactor.

Example 5

A reduced platinum on alumina catalyst of the type previously described is pretreated and activated in substantially the manner of Example 4 except that oxygen is not passed over the catalyst during the sulfur dioxide-chlorine activation, but only subsequent to the activation in the manner of Example 4. The temperature is then reduced to 400° F. and hydrogen chloride is passed over the catalyst as in the previous example, following which the catalyst is cooled. The resulting catalyst contains 3.4 percent chlorine.

Employing the test conditions of Example 4, a normal butane feed stock is converted to isobutane in an amount of 48 percent by weight of the normal butane fed to the reactor.

Example 6

This example illustrates the preparation of a catalyst activated with sulfur dioxide and chlorine in which both the hydrogen-hydrogen chloride pretreatment and the hydrogen chloride posttreatment are omitted.

One hundred tyenty-five grams of a reduced platinum on alumina catalyst is calcined and reduced in the manner described in Example 1. The temperature of the catalyst is lowered to 600° F. and a gas mixture of 16 grams of sulfur dioxide per hour, 17 grams of chlorine per hour, and 15 grams of oxygen per hour, is passed over the catalyst for a period of 5 hours. At the conclusion of the activation period, the catalyst is purged with a stream of nitrogen at 600° F. for one hour and then cooled to room temperature.

When the activity of the catalyst is tested by passing a stream of normal butane thereover at the same conditions as Examples 4 and 5, the normal butane will be converted to isobutane in an amount of about 23 percent by weight of the normal butane.

These results show that an active isomerization catalyst can be prepared using the sulfur dioxide-chlorine activation procedure without any hydrogen chloride pretreatment or posttreatment. However, the catalyst so prepared is not as active as that prepared by the preferred embodiment which includes a pretreatment and a posttreatment.

EXAMPLE 7

The catalyst preparation of Example 6 is repeated, except that oxygen is not employed along with the sulfur dioxide and chlorine treatment.

When this catalyst is tested for activity in the isomerization of normal butane under the conditions of Examples 4 through 6, a conversion of normal butane to isobutane comparable to that of Example 6 will result.

EXAMPLE 8

For comparative purposes, the procedure of Example 7 is repeated, except that at the conclusion of the sulfur dioxide and chlorine addition, the temperature is raised from 600° F. to 850° F. over a two hour period and held at 850° F. for one hour while flowing oxygen at a rate of 15 grams per hour over the catalyst.

A normal butane conversion to isobutane similar to that of Examples 6 and 7 will be obtained under the normal butane processing conditions previously employed.

EXAMPLE 9

The following example illustrates the relative effectiveness of sulfur monochloride instead of sulfur dioxide and chlorine in the activation step.

One hundred twenty-five grams of the reduced platinum on alumina catalyst of the previous examples are brought to a temperature of 1050° F. and are treated with a mixture of hydrogen and hydrogen chloride as before.

The temperature is then reduced to 600° F. and 6.7 grams of sulfur monochloride are added to the catalyst over a period of five hours. During the sulfur monochloride addition, a flow of 10.5 grams per hour of oxygen is concurrently passed over the catalyst.

The temperature is then raised to 850° F. over a period of one and three-quarter hours and is held at this temperature for one hour while maintaining the oxygen flow. The temperature is then lowered to 400° F. with nitrogen, and hydrogen chloride is passed over the catalyst at a rate of 15 grams per hour for three hours.

An analysis of this catalyst indicates a chlorine content of 3.6 percent.

Normal butane is passed over this catalyst at a temperature of 325° F., a pressure of 800 p.s.i.g., and a liquid hourly space velocity of 1. A hydrogen to butane mol ratio of 2.4 to 1 is employed. The normal butane feed stock is converted to isobutane in an amount of 43 percent by weight of the normal butane.

This example indicates, by comparison with Examples 4 and 5, that a more active catalyst can be prepared with the sulfur dioxide-chlorine activating gas than by activation with sulfur monochloride and oxygen under identical conditions.

EXAMPLE 10

This example illustrates the use of the catalyst of this invention in processing feeds containing naphthenes.

Eight hundred ninety grams of the reduced platinum on alumina catalyst of the previous examples are heated to a temperature of 1050° F. and a mixture of 110 grams of hydrogen chloride per hour and 11 standard cubic feet of hydrogen per hour are passed over the catalyst for a three hour period. The temperature is then reduced to 600° F. and a gas mixture of 11 grams per hour sulfur dioxide, 13 grams per hour chlorine and 11 grams per hour oxygen are passed over the catalyst for a 10-hour period. After this addition, the temperature is maintained at 600° F. while continuing only the flow of oxygen for one hour.

Next, the temperature is raised to 850° F., with a mixture of 11 grams per hour oxygen and 2 standard cubic feet of nitrogen per hour. The catalyst is held at 850° F. for one hour with the mixed gas flow. The temperature is then reduced to 400° F. and hydrogen chloride is passed at the rate of 110 grams per hour over the catalyst for 3 hours. An analysis of the catalyst indicates a chlorine content of 3.5 per cent.

The catalyst is tested for activity employing a feed composed of 82.6 percent by weight normal hexane and 16.7 percent by weight methylcyclopentane with small amounts of pentanes and methylpentanes, along with 3000 p.p.m. chlorine (added as $t$-butyl chloride). The feed is passed over the catalyst at a temperature of 305° F. under a pressure of 172 p.s.i.g. while employing a hydrogen to hydrocarbon molar ratio of 1.31 to 1 and a weight hourly space velocity of 1.03. The normal hexane conversion is 71.5 percent by weight while the methylcyclopentane is 51.6 percent by weight converted to cyclohexane. This conversion of methylcyclopentane to cyclohexane is the equilibrium value for the temperature employed.

EXAMPLE 11

This example illustrates that a catalyst given only the hydrogen-hydrogen chloride pretreatment has a very low activity.

One hundred twenty grams of the reduced platinum-alumina catalyst is brought to 1070° F. A mixture of 15 grams of hydrogen chloride per hour and 1.5 standard cubic feet of hydrogen per hour is passed over the catalyst for 16 hours. Following this treatment, the catalyst is cooled to room temperature in nitrogen.

A stream of normal hexane is passed over the catalyst at a temperature of 250° F. under a pressure of 250 p.s.i.g., while using a hydrogen-to-hexane molar ratio of 2.5 to 1 and a liquid hourly space velocity of 1. Hexane conversion of less than 2 percent by weight is obtained. Comparing this conversion with the values obtained in Examples 1, 2 and 3 shows that the hydrogen-hydrogen chloride pretreatment by itself does not produce an active catalyst.

Obviously many modifications and variations of the invention as hereinabove set forth can be made without departing from the spirit and scope thereof and, therefore, only such limitations should be imposed as are indicated in the appended claims.

We claim:
1. The method of activating a composite catalyst comprising a major portion of alumina and containing a minor proportion of a metalliferous material having hydrogenating activity and selected from the group consisting of a member of Group VI-A and of Group VIII, comprising contacting said composite material with a mixture comprising sulfur dioxide and chlorine, said contacting being carried out under nonreducing conditions at a temperature in the range of between 325° F. and 800° F. effective to promote a substantial increase in the chlorine content of the composite catalyst.

2. The method of claim 1 wherein the metalliferous material is platinum.

3. The method of claim 1 wherein an oxygen-containing gas is concurrently employed with the sulfur dioxide-chlorine mixture.

4. The method of claim 1 wherein the catalyst is contacted with an oxygen-containing gas subsequent to activation with the sulfur dioxide-chlorine mixture.

5. The method of claim 1 wherein the composite catalyst is treated to improve its susceptibility to activation with the sulfur dioxide-chlorine mixture by contacting the same with hydrogen chloride at a high temperature prior to sulfur dioxide-chlorine activation.

6. The method of claim 5 wherein the catalyst is contacted with hydrogen chloride subsequent to sulfur dioxide-chlorine activation.

7. The method of activating a composite catalyst comprising a major proportion of alumina and containing a minor proportion of platinum, comprising contacting said composite material with a mixture comprising sulfur dioxide and chlorine, the chlorine being employed in a weight ratio with respect to the composite material of about 0.05 to 1:1, the sulfur dioxide being employed in a mol ratio with respect to the chlorine of about 0.1 to 10:1, said contacting being carried out under nonreducing conditions in the range of about 200° to 1000° F. that is effective to promote a substantial increase in the chlorine content of the composite catalyst.

8. The method of claim 7 wherein the composite catalyst is treated to improve its susceptibility to activation with the sulfur dioxide-chlorine mixture by contacting the same with hydrogen chloride at a high temperature in the range of about 950° to 1250° F. prior to sulfur dioxide-chlorine activation, where the hydrogen chloride is employed in a weight ratio with respect to said composite catalyst of about 0.05 to 1:1.

9. The method of claim 8 wherein the catalyst is contacted with hydrogen chloride subsequent to sulfur dioxide-chlorine activation, the hydrogen chloride being employed in a weight ratio with respect to the catalyst of about 0.05 to 1:1, and the contacting is carried out at a temperature in the range of about 60° to 900° F.

10. The method of activating a composite catalyst comprising a major proportion of alumina and containing a minor proportion of platinum, comprising contacting said composite material with a mixture comprising sulfur dioxide and chlorine, the chlorine being employed in a weight ratio with respect to the composite material of about 0.1 to 0.3:1, the sulfur dioxide being employed in a mol ratio with respect to the chlorine of about 0.5 to 5:1, said contacting being carried out under nonreducing conditions at a temperature in the range of about 325° to 800° F. that is effective to promote a substantial increase in the chlorine content of the composite catalyst.

11. The method of claim 10 wherein the composite catalyst is treated to improve its susceptibility to activation with the sulfur dioxide-chlorine mixture by contacting the same with hydrogen chloride at a high temperature in the range of about 1000° to 1100° F. prior to sulfur dioxide-chlorine activation, where the hydrogen chloride is employed in a weight ratio with respect to the composite catalyst of about 0.05 to 1:1.

12. The method of claim 11 wherein the catalyst is contacted with hydrogen chloride subsequent to sulfur dioxide-chlorine activation, where the hydrogen chloride is employed in a weight ratio with respect to the catalyst of about 0.05 to 1:1, and the contacting is carried out at a temperature in the range of about 225° to 800° F.

References Cited

UNITED STATES PATENTS

| | | | |
|---|---|---|---|
| 3,322,689 | 5/1967 | Giannetti | 252—441 |
| 2,330,761 | 9/1943 | Tongberg | 260—683.5 |
| 3,238,272 | 3/1966 | Nixon | 260—683.65 |
| 2,974,111 | 3/1961 | Nixon | 252—466 |

OTHER REFERENCES

Jacobsons, Encyclopedia of Chemical Reactions, VII, 203.

DANIEL E. WYMAN, Primary Examiner

PHILIP M. FRENCH, Assistant Examiner

U.S. Cl. X.R.

252—439; 260—683.7, 683.75